(12) United States Patent
Martin

(10) Patent No.: US 6,357,312 B1
(45) Date of Patent: Mar. 19, 2002

(54) GEAR WHEEL CONSTRUCTION AND GEAR SYSTEM INCORPORATING SAME

(75) Inventor: William Wesley Martin, Northants (GB)

(73) Assignee: PreLoad International Limited, Tortola (VG)

( * ) Notice: Subject to any disclaimer, the term of this patent is extended or adjusted under 35 U.S.C. 154(b) by 0 days.

(21) Appl. No.: 09/403,355

(22) PCT Filed: Apr. 17, 1998

(86) PCT No.: PCT/AU98/00270

§ 371 Date: Mar. 6, 2000

§ 102(e) Date: Mar. 6, 2000

(87) PCT Pub. No.: WO98/48199

PCT Pub. Date: Oct. 29, 1998

(30) Foreign Application Priority Data

Apr. 18, 1997 (AU) ............................. PO6287
Aug. 5, 1997 (AU) ............................. PO8430
Dec. 8, 1997 (AU) ............................. PO0779

(51) Int. Cl.$^7$ ............................. F16H 3/083; F16H 3/12
(52) U.S. Cl. ............................. 74/372; 74/363; 74/435
(58) Field of Search ............................. 74/372, 371, 363, 74/368, 358, 435

(56) References Cited

U.S. PATENT DOCUMENTS

| 1,133,925 A | | 3/1915 | Burt |
|---|---|---|---|
| 1,597,944 A | | 8/1926 | Wilson |
| 3,548,983 A | | 12/1970 | Hiraiwa |
| 4,716,777 A | | 1/1988 | Hartmann |
| 4,727,968 A | | 3/1988 | Chana |
| 5,078,244 A | | 1/1992 | Olson |
| 5,305,651 A | * | 4/1994 | Perego ............... 74/372 |
| 5,404,768 A | | 4/1995 | Hwang et al. |
| 5,537,888 A | | 7/1996 | Pusic |
| 5,542,310 A | | 8/1996 | Lee |
| 5,560,250 A | * | 10/1996 | Hua ............... 74/371 |
| 5,570,608 A | * | 11/1996 | Miller ............... 74/372 X |
| 5,611,556 A | | 3/1997 | Davidow |
| 5,862,903 A | | 1/1999 | Gruden et al. |
| 6,065,361 A | * | 5/2000 | Martin et al. ............... 74/371 |

FOREIGN PATENT DOCUMENTS

| DE | 1024830 | 2/1958 |
|---|---|---|
| DE | 3243431 A1 | 5/1984 |
| EP | 0 253 187 A1 | 1/1988 |
| EP | 663539 | 7/1995 |
| GB | 331293 | 7/1930 |
| GB | 2183751 A | 6/1987 |
| JP | 08042642 A | 2/1996 |
| WO | WO 93/09992 | 5/1993 |
| WO | WO-98/41779 A1 * | 9/1998 |

OTHER PUBLICATIONS

Derwent Abstract Accession No. F4485B/25, SU 620716 A (Kudrin L F) Jul. 4, 1978.

* cited by examiner

Primary Examiner—Charles A Marmor
Assistant Examiner—Ankur Parekh
(74) Attorney, Agent, or Firm—Reising, Ethington, Barnes, Kisselle, Learman & McCulloch, PC

(57) ABSTRACT

A gear wheel construction for use in a constant mesh gear box, the gear wheel construction characterized by a single gear wheel (100) provided about a shaft (18) in a rotatable and engageable manner, the gear wheel (100) being divided longitudinally (axially) into two components, the first being a synchro-gear wheel (102) and the second gear being a partially toothed gear wheel (104), wherein the synchro-gear wheel (102) is provided in constant mesh with a gear wheel (106) forming its gear wheel pair whilst the partially toothed gear wheel (104) is meshed therewith intermittently during rotation, the synchro-gear wheel (102) and the partially toothed gear wheel (104) having provided therebetween at least one biasing means (108) allowing momentary asynchronous rotation therein.

18 Claims, 3 Drawing Sheets

GEAR WHEEL CONSTRUCTION AND GEAR SYSTEM INCORPORATING SAME

FIELD OF THE INVENTION

The present invention relates to a gear wheel construction. More particularly, the gear wheel construction of the present invention is intended for use in gear systems adapted to allow changing of gears under load without the need for a traditional clutch and with the substantial minimisation of any momentary reduction in power input to the system.

DISCUSSION OF THE PRIOR ART

Constant mesh gear boxes generally rely on a means to lock and unlock individual gears with respect to a drive shaft. Unlocking a gear disengages that gear ratio and allows the gear to rotate freely about the shaft. Conversely, locking a gear with respect to the shaft causes that gear ratio to be engaged.

This sequence allows transmission of power from the shaft in respect of which that gear has been locked to another shaft about which a complimentary gear is provided in fixed or locked relation, at that gear ratio. Such gear pairs or ratios are generally in constant mesh aligned along the length of two substantially parallel shafts. One gear pair or ratio is engaged at any one time whilst the remaining gear pairs or ratios rotate freely about the shaft.

The applicant's co-pending International Patent Application PCT/AU98/00181 discloses a gear system wherein gears may be changed under load by engaging the next desired gear whilst the presently engaged gear remains engaged also. The newly engaged gear assumes the load from the previous gear allowing that previous gear to unlock freely from its shaft.

This gear system may present a problem when a user wishes to change "down" through gears when under load as the previously engaged gears only unlock upon subsequent engagement or pre-loading of a gear wheel that causes the driven shaft to rotate more quickly. A "down" gear change from a "tall" or high gear to a "shorter" or lower gear does not allow that "tall" gear to disengage from the shaft.

The gear wheel construction of the present invention has as one object thereof to overcome the above problems associated with the prior art.

Throughout the specification, unless the context requires otherwise, the word "comprise" or variations such as "comprises" or "comprising", will be understood to imply the inclusion of a stated integer or group of integers but not the exclusion of any other integer or group of integers.

BRIEF DESCRIPTION OF THE INVENTION

In accordance with the present invention there is provided a gear wheel construction for use in a constant mesh gear box, the gear wheel construction characterised by a single gear wheel provided about a shaft in a rotatable and engageable manner, the gear wheel being divided longitudinally (axially) into two components, the first being a synchro-gear wheel and the second gear being a partially toothed gear wheel, wherein the synchro-gear wheel is provided in constant mesh with a gear wheel forming its gear wheel pair whilst the partially toothed gear wheel is meshed therewith intermittently during rotation, the synchro-gear wheel and the partially toothed gear wheel having provided therebetween at least one biasing means allowing momentary asynchronous rotation therein.

Preferably, the synchro-gear wheel is provided about its shaft in a rotatable manner only, the partially toothed gear wheel alone being able to releasably engage the shaft.

Still preferably, the or each biasing means act to draw the partially toothed gear wheel and synchro-gear wheel into synchronous rotation after any momentary asynchronous rotation. The force required to disengage the partially toothed gear wheel from its shaft is preferably greater than the force exerted thereon by the or each biasing means.

In accordance with the present invention there is further provided a gear system characterised by a pair of substantially parallel shafts, each shaft having provided thereabout at least two gear wheels forming gear wheel pairs or ratios with those gear wheels on the other shaft, wherein a rotary force applied to one shaft may be transferred to the other shaft through the gear wheels associated therewith upon that gear wheel pair being engaged with the shaft, wherein at least one of the gear wheel pairs has one gear wheel of that pair divided longitudinally (axially) into two components, the first being a synchro-gear wheel and the second gear being a partially toothed gear wheel, wherein the synchro-gear wheel is provided in constant mesh with a gear wheel forming its gear wheel pair whilst the partially toothed gear wheel is meshed therewith intermittently during rotation, the synchro-gear wheel and the partially toothed gear wheel having provided therebetween at least one biasing means allowing momentary asynchronous rotation therein.

In accordance with the present invention there is still further provided a method of changing down from a tall or higher gear to a shorter or lower gear in a constant mesh gear system under load, the method characterised by the method steps:

calling for a down gear change;

simultaneously disengaging the taller gear from the shaft and engaging a gear wheel comprising both a synchro-gear wheel and a partially toothed gear wheel, asynchronous rotation of the partially toothed gear wheel with respect to the synchro-gear wheel allowing the taller gear to unlock; and engaging the shorter gear with the shaft.

The method of the present invention preferably further provides for the partially toothed gear wheel to return to synchronous rotation with the synchro-gear wheel. Such may be achieved through the action of a biasing means provided between the synchro-gear wheel and the partially toothed gear wheel.

The method of the present invention may be achieved, in bicycles, through use of a hand controller to cause momentary engagement of the gear wheel incorporating the partially toothed gear wheel.

Preferably, the method of the present invention may be put into effect by way of a form of programmable logic controller, microprocessor, computer, or engine management system. The step of calling for a change in gear may be initiated automatically by the programmable logic controller, microprocessor, computer, or engine management system or may be initiated manually.

For bicycles, the gear system of the present invention can be incorporated into a chainless drive shaft between the crank and the rear wheel. The system may be fitted with a dual rear bevel gear and a dual direction rear wheel ratchet/roller clutch to provide power during back pedalling. This arrangement allows step pedalling and allows the rider to power forwards by alternately shifting his weight from one foot to the other whilst standing upon the pedals of the bicycle. This arrangement allows power to be maintained while the rider is negotiating rough or otherwise difficult terrain. Alternatively, the gear system may be provided with a rear foot brake. It is envisaged that a dual ratchet or full lock pawl arrangement for engagement of the gear wheels would be required for step pedalling or rear foot braking.

DESCRIPTION OF THE DRAWINGS

The gear wheel construction of the present invention will now be described, by way of example only, with reference to one embodiment thereof and the accompanying drawings, in which.

DESCRIPTION

Figure 1:
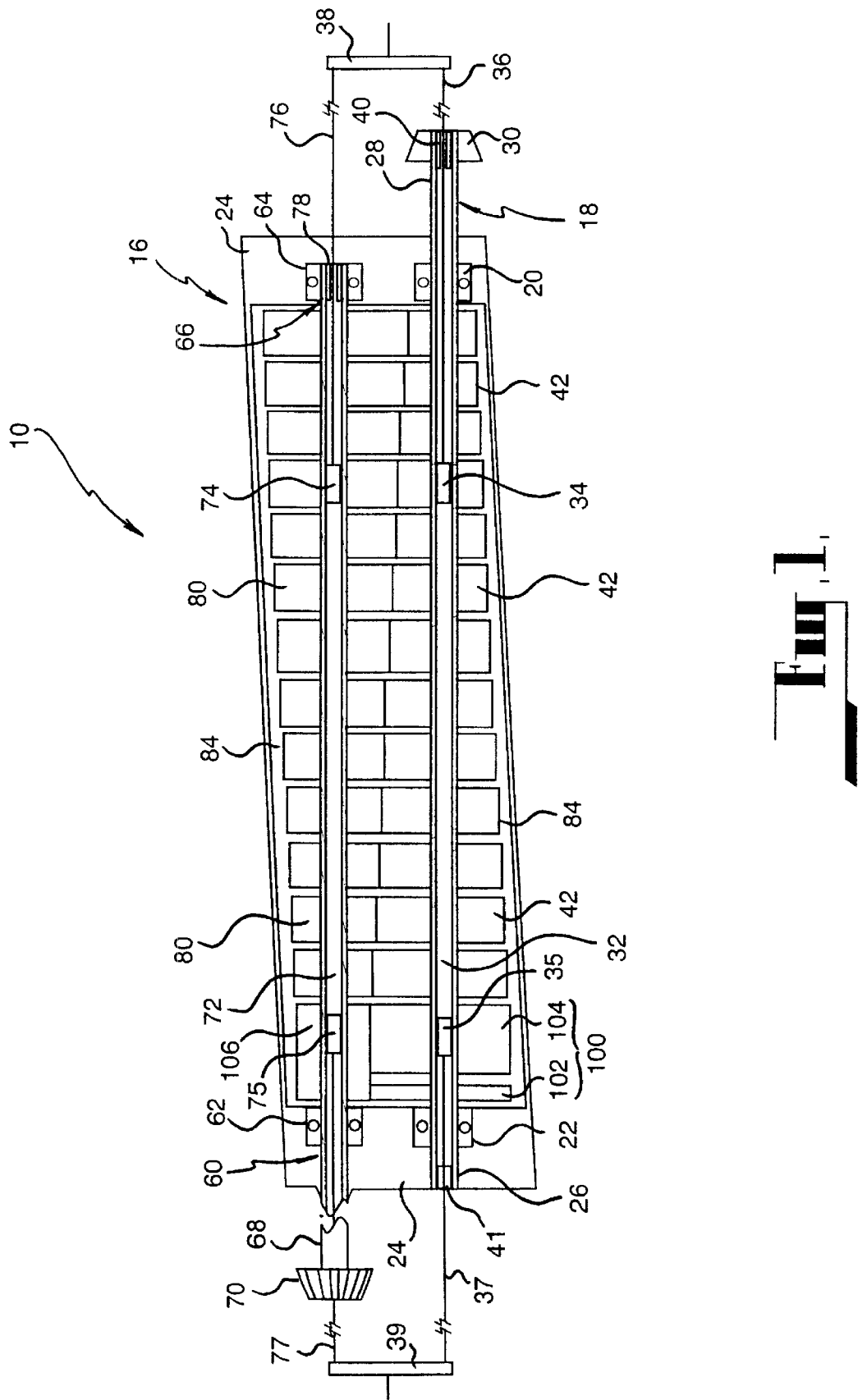
FIG. 1 is a diagrammatic cross-sectional view taken longitudinally (axially) through a gear system utilising a gear wheel construction in accordance with the present invention.

In FIG. 1 there is shown a gear system 10 suitable for use with a bicycle. The gear system 10 comprises a casing 16, shown in part and in section. A first shaft 18 is mounted in the casing 16 by way of bearing means, for example a single row ball bearings 20 and 22. The ball bearings 20 and 22 are rigidly located in the end portions 24 of the casing 16. The first shaft 18 has a first end 26 received and held within the ball bearing 22. A free or second end 28 of the shaft 18 has rigidly located thereabout a bevel gear wheel 30, such that upon rotation of the bevel gear 30 the first shaft 18 also rotates.

The first shaft 18 has provided therein a hollow bore 32. A roving magnet 34 is located within the bore 32 in a manner such that it may travel almost the entire length thereof and the roving magnet 34 is proportioned accordingly. The roving magnet 34 has a guide cable 36 attached thereto and extends through the bore 32 therefrom and further through the second end 28 of the first shaft 18. The guide cable 36 extends to an index member 38 to which it is rigidly but adjustably connected. An annular bush 40 is provided within the bore 32 adjacent the second end 28 and through which the guide cable 36 extends. The bush 40 acts as a seal and aids in the smooth travel of the guide cable 36, thereby preventing wear of the guide cable 36 and the first shaft 18.

A series of pawl gear wheels 42 are provided about the first shaft 18 such that these gear wheels 42 may rotate freely and independently about the shaft 18. However, if required these pawl gear wheels 42 may be caused to engage the first shaft 18 and rotate therewith.

A further roving magnet 35 is additionally located within the bore 32 in a manner whereby it may travel through only a limited length thereof. The roving magnet 35 is similarly proportioned to the roving magnet 34, allowing each to travel longitudinally or axially within the bore 32. The roving magnets 34 and 35 are arranged such that they cannot pass or overlap one another within the bore 32.

The roving magnet 35 has a guide cable 37 attached thereto and extending through the bore 32 therefrom and further through the first end 26 of the first shaft 18. The guide cable 37 extends to an index member 39 to which it is rigidly but adjustably connected. An annular bush 41 is provided within the bore 32 adjacent the first end 26 and through which the guide cable 37 extends. The bush 41 functions similarly to the bush 40.

A second shaft 60 is mounted in the casing 16 by way of bearing means, for example single row ball bearing 62 and 64. The ball bearings 62 and 64 are rigidly located in the end portions 24 of the casing 16 and are arranged such that the shafts 18 and 60 are substantially parallel. The second shaft 60 has a first end 66 received and held within the ball bearing 64. A free or second end 68 of the shaft 60 has rigidly located thereabout a bevel gear wheel 70, such that upon rotation of the second shaft 60 the bevel gear 70 also rotates.

The second shaft 60 has provided therein a hollow bore. A roving magnet 74 is located within the bore 72 in a manner such that it may travel almost the entire length thereof and the roving magnet 74 is proportioned accordingly. The roving magnet 74 has a guide cable 76 attached thereto and extends through the bore 72 therefrom and through the first end 66 of the second shaft 60. The guide cable 76 extends to the index member 38 to which it is rigidly but adjustably connected. An annular bush 78 is provided within the bore 72 adjacent the second end 66 and projects through a portion of the end portion 24 of the casing 16. The bush 78 acts as a seal and aids in the smooth travel of the guide cable 76, thereby preventing wear of the guide cable 76 and the second shaft 60.

A further roving magnet 75 is additionally located within the bore 72 in a manner whereby it may travel through only a limited length thereof. The roving magnet 75 is similarly proportioned to the roving magnet 74, allowing each to travel longitudinally or axially within the bore 72. The roving magnets 34 and 35 are arranged such that they cannot pass or overlap one another within the bore 72.

The roving magnet 75 has a guide cable 77 attached thereto and extending through the bore 72 therefrom and further through the second end 68 of the second shaft 60. The guide cable 77 extends to the index member 39 to which it is rigidly but adjustably connected. An annular bush (not shown) is provided within the bore 72 adjacent the second end 68 and through which the guide cable 77 extends. This bush functions similarly to the bush 78.

It is envisaged that the roving magnets 34, 35, 74 and 75 may be provided in the form of neodymium rare earth magnets although such should not be considered to limit the scope of the present invention.

A series of pawl gear wheels 80 are provided about the second shaft 60 such that these gear wheels 80 may rotate freely and independently about the shaft 60. However, if required these pawl gear wheels 80 may be caused to engage the second shaft 60 and rotate therewith.

The gear wheels 42 and 80 are housed within the casing 16 in a chamber 84. The chamber is provided with a volume of lubricant (not shown). The casing 16 is arranged on a bicycle such that the bevel gear wheel 30 of the first shaft 18 engages a gear wheel provided on a pedal-crank (not shown). Accordingly, drive imparted by a rider (not shown) through the pedal-crank is transferred to the first shaft 18 which is caused to rotate. It is to be understood that the casing 16 preferably covers or encloses the bevel gear wheels 30 and 70. As such, the casing 16 may have appropriate apertures provided therein to allow access thereinto by the gear wheels provided on the pedal-crank and the axle.

The gear wheels 42 provided on the first shaft 18 engage a complimentary gear wheel 80 on the second shaft 60. In this manner gear wheel pairs are provided and result in drive from one shaft being transferable to the other shaft. A gear wheel pair is comprised of two pawl gear wheels. The relative diameters of the fixed and pawl gear wheels in a pair determine the gear ratio provided by that gear wheel pair. It is envisaged that a number of arrangements with regard to the fixing of the gear wheels relative to their shaft may be utilised. These arrangements are discussed in more detail hereinafter. However, in each arrangement at least one of the gear wheels of each gear wheel pair or ratio is fixedly attached to its shaft whilst the other gear wheel of that pair or ratio is releasably engagable with the shaft about which it is provided.

The bevel gear wheel 70 provided on the second end 68 of the second shaft 60 engages a gear wheel provided on an axle of the hub of a rear wheel (not shown). In this manner, drive transferred from the first shaft 18 to the second shaft 60 is in turn transferred to the rear wheel.

The engagement of gear wheels 42 and 80 with their shafts 18 and 60 is achieved through positioning of the roving magnets 34 and 74 alongside those gear wheels, which in turn causes pawl members provided in either the shafts 18 and 60, or the gear wheels 42 and 80, to engage, This results in drive from one shaft being transferred through the gear wheels to the other shaft in the chosen gear ratio. The nature of the pawl members and the mechanism utilised to achieve engagement and disengagement of the shafts and gear wheels is fully described in the applicant's co-pending International Patent Applications PCT/AU97/00181 and PCT/AU97/00024 (WO/97/26468), the content of which is to be incorporated herein by reference.

The first shaft 18 has provided thereon a gear wheel 100, the gear wheel 100 being divided into a synchro-gear wheel 102 and a partially toothed gear wheel 104. The gear wheel 100 is provided in constant mesh with a complimentary gear wheel 106 provided about the second shaft 60. It is to be understood that whilst only a single gear wheel 100 need be provided, more than one gear wheel 100 may improve efficiency of the gear system 10.

The gear wheels 100 and 106 are generally twice the width of gear wheels 42 and 80. The synchro-gear wheel 102 is thinner longitudinally (axially) than the load bearing partially toothed gear wheel 104.

The synchro-gear wheel 102 is able to rotate freely about, and with respect to the shaft 18. A biasing means, to be discussed hereinafter, is provided between the synchro-gear wheel 102 and the partially toothed gear wheel 104 to facilitate synchronous rotation therein. The partially toothed gear wheel is releasably engageable with the shaft 18 in known manner, as are the gear wheels 42 and 80.

The roving magnets 35 and 75 are arranged within the bores 32 and 72 respectively, so as to travel longitudinally (axially) only the length of the gear wheels 100 and 106, respectively, and a short distance into the adjacent end portion 24 of the casing 16.

Figure 2:
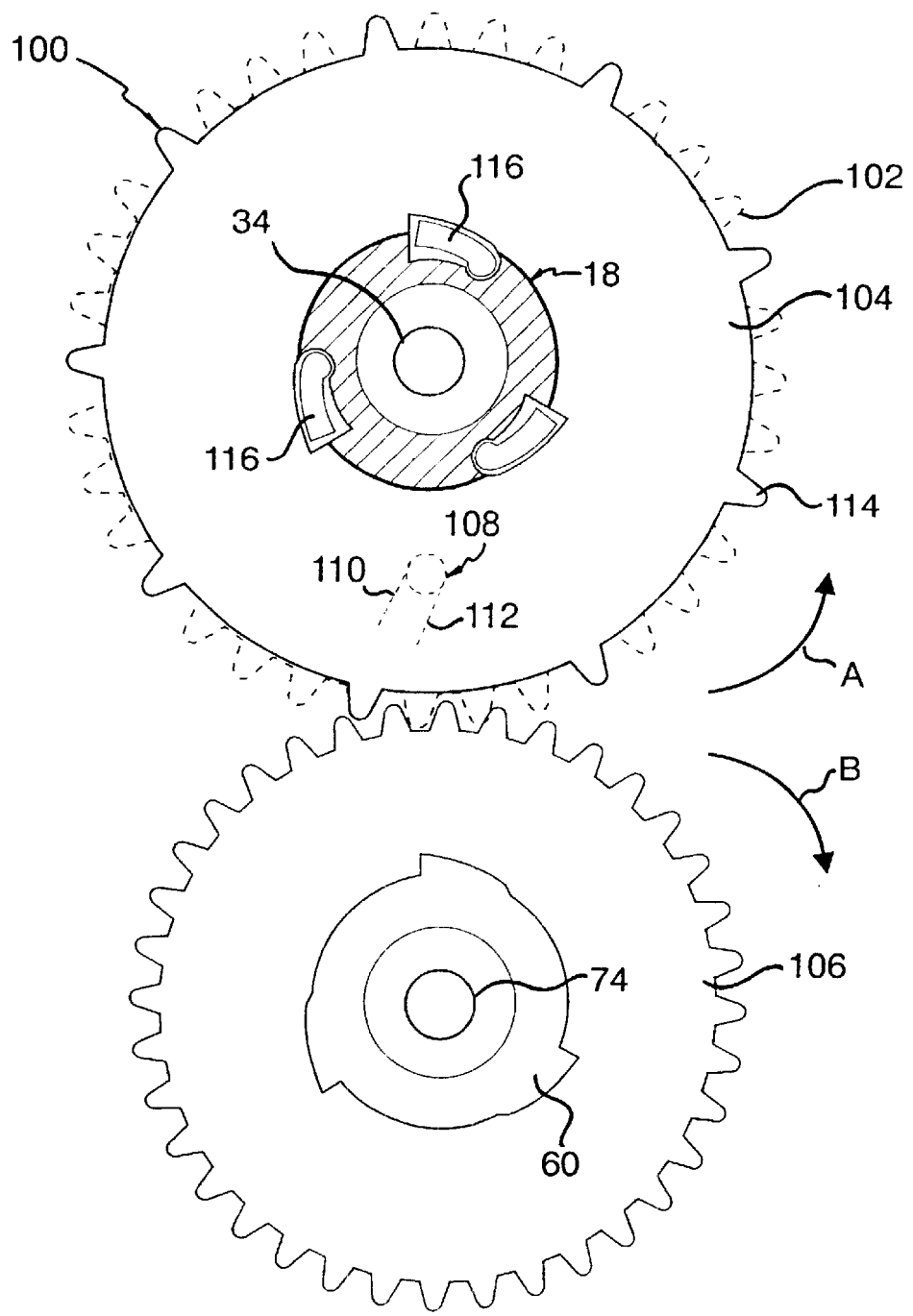
FIG. 2 is a cross-sectional view through the shafts of the gear system of FIG. 1 showing a partially toothed gear wheel in engagement with its shaft, a synchro-gear wheel located therebehind and shown in phantom, and further showing a biasing means in phantom between the partially toothed and synchro-gear wheels.
Figure 3:
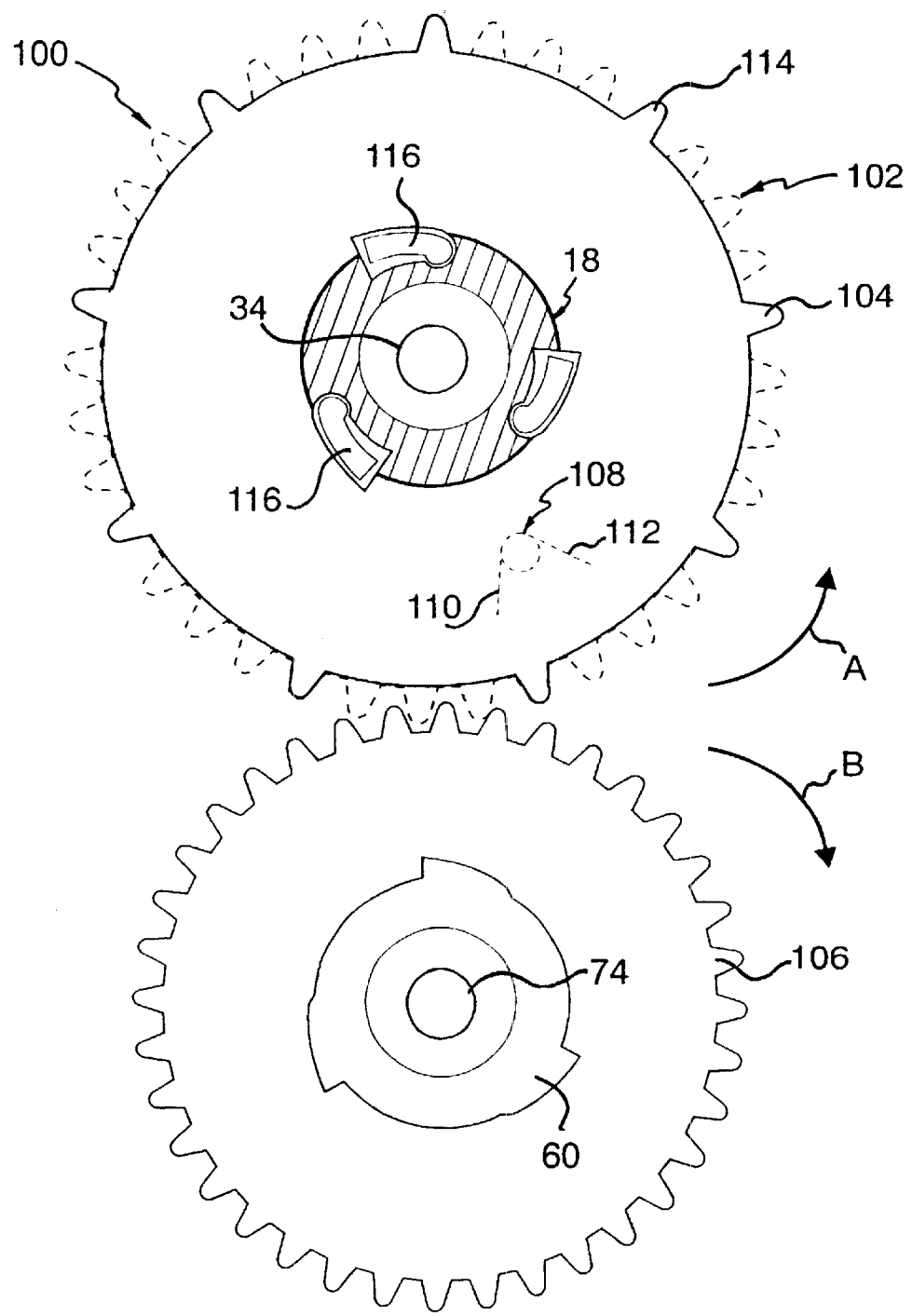
FIG. 3 is a cross-sectional view in accordance with FIG. 2, showing the partially toothed gear wheel and synchro-gear wheel moving asynchronously thereby causing the biasing means to extend or flex.

In FIGS. 2 and 3 there is shown the gear wheels 100 and 106. The partially toothed gear wheel 104 is shown engaged with the shaft 18 and rotating in the direction of arrow A, thereby introducing movement in the direction of arrow B in the gear wheel 106 and shaft 60 to which it is suitably engaged.

The synchro-gear wheel 102 is shown behind the partially toothed gear wheel 104 and is held to synchronous rotation therewith by way of a biasing means, for example a spring 108, shown in contracted position in FIG. 2 and in extended or flexed position in FIG. 3. The spring 108 comprises arms 110 and 112, arm 110 being affixed to the synchro-gear wheel 102 and arm 112 being affixed to the partially toothed gear wheel 104.

Both the synchro-gear wheel 102 and gear wheel 106 are provided with regularly spaced constantly meshed teeth, whereas the partially toothed gear wheel 104 has teeth 114 provided thereon at a much greater spacing, thereby not allowing a constant mesh with the teeth of the gear wheel 106.

It is envisaged that the gear system 10 of the present invention may be provided in a form such that all the gear wheels provided on the driven shaft thereof, for example shaft 60, are fixedly attached thereto and will rotate therewith at all times. It is further envisaged that the two shafts of the gear system 10 may be provided such that half of the gear wheels provided thereabout are fixedly attached thereto and the other half are not. The arrangement would be such that each gear wheel pair has one gear wheel thereof fixedly attached to its shaft at all times. An arrangement of this nature is disclosed in the applicant's co-pending International Patent Application PCT/AU97/00024 (WO 97/26468).

In use, upward changes through the gears of the gear system 10 are achieved in known manner whereby the pawl members of a shorter gear are disengaged whilst the pawl members of the taller gear are engaged. The pawl members of the shorter gear do not disengage immediately and the subsequent increased rate of rotation imparted through the taller gear causes the final disengaging of the pawl members of the shorter gear, thereby "unloading" the shorter gear. This sequence has been referred to in the applicant's co-pending International Patent Applications as "pre-loading" of the gears and allows minimal interruption of power transmission. However, as noted previously this sequence is not generally successful when changing from a taller gear to a shorter gear as the taller gear is not able to "unload" in the same manner. It is necessary to introduce a system whereby the taller gear may be unloaded and thereby allow all the pawl members thereof to disengage.

Accordingly, when it is necessary to change from a taller gear ratio to a shorter gear ratio, alternatively referred to as a higher gear ratio to a lower gear ratio, the gear wheel pair 100 and 106 are engaged momentarily. Prior to their engagement, the gear wheels 100 and 106 will have been rotating freely with respect to their shafts 18 and 60, respectively. At the moment of engagement the gear wheels 100 and 106 rotate with their shafts 18 and 60, respectively.

As can be seen with reference to FIG. 2, the synchro-gear wheel 102 and partially toothed gear wheel 104 rotate together in the direction of arrow A through the action of the spring 108 keeping the same asynchronous rotation whilst the tooth 114 of the partially toothed gear wheel 104 is in engagement with the gear wheel 106. Upon the gear wheel 100 rotating to the position shown in FIG. 3 in which the tooth 114 of the partially toothed gear wheel 104 is no longer in engagement with the teeth of the gear wheel 106, the partially toothed gear wheel 104 is driven ahead or slips forward, out of sync, with respect to the synchro-gear wheel 102. In this position the spring 108 is flexed or extended. Further, this motion allows the unloading of the taller gear and the full engagement of the shorter gear. Importantly, the force utilised to unlock pawls 116 engaging the partially toothed gear wheel must be greater than the force exerted on the partially toothed gear wheel 104 by the action of the spring 108.

Upon unloading of the taller gear the pawl members 116 associated with the partially toothed gear wheel 104 may disengage thereby allowing the partially toothed gear wheel 104 to return, under the action of the spring 108, to the position shown in FIG. 3 and synchronous movement with the synchro-gear wheel 102.

If only a single gear wheel 100 is provided in a gear system it is required that it be provided at the highest gear ratio in the gear system. If it is not it cannot function to unload all other gear wheel pairs in the gear system as required.

It is envisaged that a separate activating system may be required for the selection and engagement of the gear wheels 100 and 106. Such separate activating system may be mechanical, magnetic and/or electromagnetic. A programmable logic controller (PLC), computer or engine management system may be utilised to control the appropriate sequence.

It is further envisaged that a mechanism may be provided so as to prevent the gear wheel 104 locking and loading in a toothless region thereof. The locking of the pawl members associated with the partially toothed gear wheel 104 may be provided whereby such are only able to be deployed and engaged with the assistance or synchronisation of the teeth 114 provided thereon. In this manner, the toothless region of the partially toothed gear wheel 104 could not activate locking of the pawl members associated therewith.

Consequently, two actions would be required to allow engagement of the partially toothed gear wheel 104. Firstly, the appropriate signal, whether it be mechanical, magnetic or electromagnetic must be provided and secondly a tooth 114 of the partially toothed gear wheel 104 must be in meshed engagement with the teeth of gear wheel 106.

It is still further envisaged that the roving permanent magnets of the gear system 10 described herein previously may be replaced by roving electromagnets or by a series or array of electromagnets. Such electromagnets may be activated to cause engagement of a gear wheel with its shaft as required. The provision of a single electromagnet for each gear wheel, suitably positioned in the shaft or casing, is envisaged as preferable as this results in less moving components.

For bicycles, the gear system of the present invention can be incorporated into a chainless drive shaft between the crank and the rear wheel. The system may be fitted with a dual rear bevel gear and a dual direction rear wheel ratchet/ roller clutch to provide power during back pedalling. This arrangement allows step pedalling and allows the rider to power forwards by alternately shifting his weight from one foot to the other whilst standing upon the pedals of the bicycle. This arrangement allows power to be maintained while the rider is negotiating rough or otherwise difficult terrain. Alternatively, the gear system may be provided with a rear foot brake. Alternatively, the gear system may be provided with a rear foot brake. It is envisaged that a dual ratchet or full lock pawl arrangement for engagement of the gear wheels would be required for step pedalling or rear foot braking.

Modifications and variations such as would be apparent to the skilled addressee are considered to fall within the scope of the present invention.

What is claimed is:

1. A gear wheel construction for use in a constant mesh gear box, the gear wheel construction characterised by a single gear wheel provided about a shaft in a rotatable and engageable manner, the gear wheel being divided longitudinally (axially) into two components, the first being a synchro-gear wheel and the second gear being a partially toothed gear wheel, wherein the synchro-gear wheel is provided in constant mesh with a gear wheel forming its gear wheel pair whilst the partially toothed gear wheel is meshed therewith intermittently during rotation, the synchro-gear wheel and the partially toothed gear wheel having provided therebetween at least one biasing means allowing momentary asynchronous rotation therein.

2. A gear wheel construction according to claim 1, characterised in that the synchro-gear wheel is provided about its shaft in a rotatable manner only, the partially toothed gear wheel of that gear pair alone being able to releasably engage the shaft.

3. A gear wheel construction according to claim 1, characterised in that the or each biasing means acts to draw the partially toothed gear wheel and synchro-gear wheel into synchronous rotation after any momentary asynchronous rotation.

4. A gear wheel construction according to claim 1, characterised in that the force required to disengage the partially toothed gear wheel from its shaft is greater than the force exerted thereon by the or each biasing means.

5. A gear wheel construction according to claim 1, characterised in that the synchro-gear wheel is longitudinally (axially) thinner than the load bearing partially toothed gear wheel.

6. A gear system characterised by a pair of substantially parallel shafts, each shaft having provided thereabout at least two gear wheels forming gear wheel pairs or ratios with those gear wheels on the other shaft, wherein a rotary force applied to one shaft may be transferred to the other shaft through the gear wheels associated therewith upon that gear wheel pair being engaged with the shaft, wherein at least one of the gear wheel pairs has one gear wheel of that pair divided longitudinally (axially) into two components, the first being a synchro-gear wheel and the second gear being a partially toothed gear wheel, wherein the synchro-gear wheel is provided in constant mesh with a gear wheel forming its gear wheel pair whilst the partially toothed gear wheel is meshed therewith intermittently during rotation, the synchro-gear wheel and the partially toothed gear wheel having provided therebetween at least one biasing means allowing momentary asynchronous rotation therein.

7. A gear system according to claim 6, characterised in that the or each gear wheel divided into the synchro-gear wheel and the partially toothed gear wheel are about twice the width of the remaining gear wheels of the gear system.

8. A gear system according to claims 6, characterised in that two roving magnets are provided within a bore in the or each shaft, one roving magnet acting upon the gear wheel pair in which one gear wheel thereof is provided in a divided manner, and the remaining roving magnet acting upon the remainder of the gear wheel pairs.

9. A gear system according to claim 6, characterised in that an array of electromagnets is provided in the or each shaft, there being a single electromagnet provided adjacent to each gear wheel releasably engagable with its shaft.

10. A gear system according to claim 8, characterised in that the or each roving magnet has an independent guide cable attached thereto and through which a user may control the position thereof with respect to each shaft and the gear wheels provided thereabout.

11. A gear system according to claim 6, characterised in that a dual rear bevel gear and a dual direction ratchet/roller clutch are additionally provided in a chainless drive between a crank and a rear wheel of a bicycle, this arrangement thereby allowing power transmission during back pedalling or rear foot braking.

12. A method of changing down from a taller or higher gear to a shorter or lower gear in a constant mesh gear system, the method characterised by the method steps:

calling for a down gear change;

simultaneously disengaging the taller gear from the shaft and engaging a gear wheel comprising both a synchro-gear wheel and a partially toothed gear wheel, asynchronous rotation of the partially toothed gear wheel with respect to the synchro-gear wheel allowing the taller gear to unlock; and engaging the shorter gear with the shaft.

13. A method according to claim 12, characterised in that there is provided a further method step in which the partially toothed gear wheel subsequently returns to synchronous rotation with the synchro-gear wheel.

14. A method according to claim 13, characterised in that the return of the partially toothed gear wheel is achieved through the action of a biasing means provided between the synchro-gear wheel and the partially toothed gear wheel.

15. A method according to claim 12, characterised in that the method steps are achieved, in bicycles, through use of a hand controller to cause momentary engagement of the gear wheel incorporating the partially toothed gear wheel.

16. A method according to claim 12, characterised in that the method steps are put into effect by way of a form of programmable logic controller, microprocessor, computer, or engine management system.

17. A method according to claim 12, characterised in that the step of calling for a change in gear is initiated automatically by the programmable logic controller, microprocessor, computer, or engine management system or may be initiated manually.

18. A method according to claim 12, characterised in that to achieve engagement of the partially toothed gear wheel two actions are required, an appropriate signal for engagement and a tooth of the partially toothed gear wheel must be engaged.

* * * * *